(12) United States Patent
May

(10) Patent No.: US 6,278,120 B1
(45) Date of Patent: Aug. 21, 2001

(54) UV SENSOR

(75) Inventor: Joe T. May, Leesburg, VA (US)

(73) Assignee: Electronic Instrumentation and Technology, Inc., Sterling, VA (US)

( * ) Notice: Subject to any disclaimer, the term of this patent is extended or adjusted under 35 U.S.C. 154(b) by 0 days.

(21) Appl. No.: 09/301,485

(22) Filed: Apr. 28, 1999

(51) Int. Cl.$^7$ .................................................. G01J 1/04
(52) U.S. Cl. .............................................................. 250/372
(58) Field of Search .............................. 250/372, 372 EM

(56) References Cited

U.S. PATENT DOCUMENTS 5,497,004 * 3/1996 Rudolph et al. ..................... 250/372
5,514,871 * 5/1996 Hayes et al. .......................... 250/372

* cited by examiner

Primary Examiner—Georgia Epps
Assistant Examiner—Richard Hanig

(74) Attorney, Agent, or Firm—McGuireWoods LLP

(57) ABSTRACT

A UV sensor design which virtually eliminates solarization effects on optical components and photodetector and is effective for both broad area and collimated light sources. The sensor design reduces the number of photons striking a unit area of any of the materials in the light path sensitive to UV light to a level which does not produce appreciable solarization over very long periods of time. The UV sensor has as the first optical element in the viewing path a UV transmitting, extremely low solarization window. The back surface of this window is frosted to produce some diffusion of the UV rays. A small metal disc with a very small aperture is the next optical element and reduces the total amount of energy admitted to the optical measurement system. A second frosted UV transmitting, extremely low solarization window further diffuses the light beam passing through the aperture. The UV light from this second window travels toward to two UV filters and is further dispersed to produce low intensity level UV light which impinges on a silicon photodetector.

6 Claims, 2 Drawing Sheets

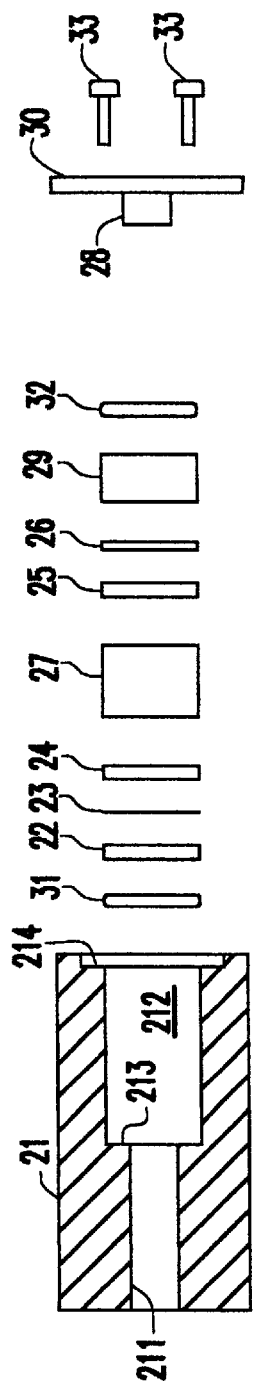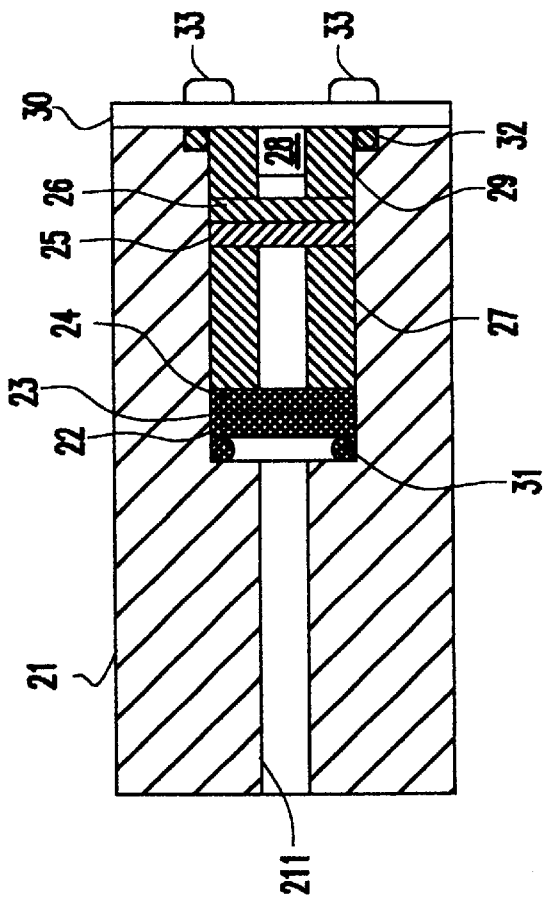
FIG. 2
FIG. 2A

UV SENSOR

BACKGROUND OF THE INVENTION

1. Field of the Invention

The present invention generally relates to ultraviolet sensors and, more particularly, to a sensor design which virtually eliminates solarization effects on optical components and photodetector.

2. Background Description

Ultraviolet (UV) radiation has been long known to produce solarization in materials. Solarization presents a major problem in UV measuring instruments because it changes the transmission characteristics of the measurement light path and hence, changes the reading produced by the instrument.

The degree of solarization is a function of, among other factors, how many UV photons strike the material. Since there is a finite probability that a single photon striking a piece of material will cause a physical change in the material, one key to reducing solarization is to reduce the number of photons striking the material in question. However, UV measurements require a finite number of photons striking a unit area to make a measurement.

The problem is a long standing problem. One attempt to solve the problem is disclosed in U.S. Pat. No. 5,514,871 to Hayes et al. The Hayes et al. UV sensor comprises an attenuating aperture, filter and photodetector serially disposed in the path of the UV radiation. If the light source covers a large viewing angle, the light source will be attenuated by the ratio of the size of the aperture divided by the height of the light source. However, if the light rays are collimated (parallel to each other), the aperture will pass the rays with unattenuated intensity. While the unattenuated rays would form an image only the size of the aperture, they would be unattenuated and the associated intensity would be sufficient to solarize the filters and detector in the area where the spot fell. Thus, the Hayes et al. approach works only for large area sources.

SUMMARY OF THE INVENTION

It is therefore an object of the present invention to provide a UV sensor design that virtually eliminates solarization effects on optical components and the photodetector.

It is another object of the invention to provide a UV sensor design that allows the use of optical components, particularly short wavelength UV filters, which would otherwise be unusable because of susceptibility to moisture and external gases that would attack the filters if they came into contact with them.

It is a further object of the invention to provide a UV sensor design which is effective for both broad area and collimated light sources.

According to the invention, there is provided a technique for reducing the number of photons, striking a unit area of any of the materials in the path and sensitive to UV light, to a level which does not produce appreciable solarization even over very long periods of time. The UV sensor has as the first optical element in the viewing path a UV transmitting, extremely low solarization window. The back surface of this window is frosted to produce some diffusion of the UV rays. A metal disc with a small aperture is the next optical element and reduces the total amount of energy admitted to the optical measurement system. A second frosted UV transmitting, extremely low solarization window further diffuses the light beam that has passed through the aperture. The UV light from this second window travels toward to two UV filters and is further dispersed to produce low intensity level UV light which impinges on a silicon photodetector.

The UV sensor, according to the present invention, is effective for both broad area and collimated light sources. The back surface of the first UV transmitting, extremely low solarization window is frosted so that broad area image, semi-collimated or collimated rays are uniformly scattered over an 180° angle. Only a portion of the original, scattered rays pass through the aperture. The attenuated rays which pass through the aperture strike the second window whose back surface is also frosted to produce additional scattering. This scattering and aperture attenuation produces an aggregate attenuation of the light rays which reduces the intensity to a level and uniformity of distribution that will not produce solarization on the filter andlor the photodetector.

BRIEF DESCRIPTION OF THE DRAWINGS

The foregoing and other objects, aspects and advantages will be better understood from the following detailed description of a preferred embodiment of the invention with reference to the drawings, in which:

FIG. 2 is an exploded cross-sectional view of the UV sensor according to the present invention; and FIG. 2A is a cross-sectional view of the assembled UV sensor.

DETAILED DESCRIPTION OF A PREFERRED EMBODIMENT OF THE INVENTION

Figure 1:
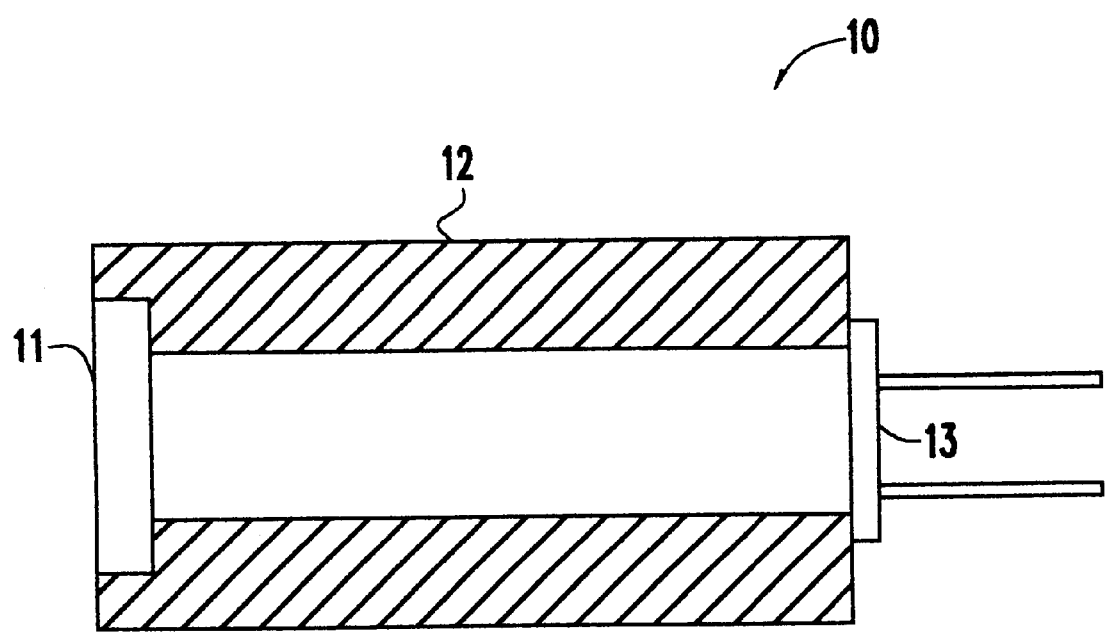
FIG. 1 is a diagram of a typical UV sensor.

Referring now to the drawings, and more particularly to FIG. 1, there is shown a representation of a typical UV sensor 10. UV light is passed through an optical filter 11 which rejects all wavelengths except those of interest. The filter 11 is contained within and at one end of a housing 12. At the other end of the housing 12 is a silicon photodetector 13, whose output is a current proportional to the number of photons striking it per unit time (intensity), which is the sensing element. While not part of this invention, the current from the sensor is converted to a voltage by an external circuit (not shown) and intensity is read as a numerical value on a voltage reading device (also not shown).

A typical very low solarization sensor design is shown in exploded cross-section in FIG. 2 and assembled in FIG. 2A. An aluminum housing 21, which contains the optical components, is mechanically oriented so that its viewing port 211 opening at one end of the housing is exposed to a UV source. The viewing port 211 extends longitudinally through the housing 21 and opens into a larger, cylindrical cavity 212. The intersection of the viewing port 211 and the cavity 212 forming an interior shoulder 213. The cavity 212 continues longitudinally through the housing 21, opening at the other end of the housing. A rabbet is formed about the cavity opening to form an exterior shoulder 214.

Within the cavity, a fused silica (e.g., a product manufactured by Corning under the trademark Suprasil®) or other UV transmitting, extemely low solarization window 22 is the first optical element in the viewing path. The UV intensity at this point is relatively high and capable of causing rapid solarization of various other elements in the optical path if not reduced in magnitude. The Suprasil® window 22 is highly immune to solarization and hence, is not affected by the incident UV.

The back surface of the window 22 is frosted to produce some diffusion of the UV rays. This produces some reduction in the UV intensity and reduces imaging or "hot spots" in the UV light path.

A small metal disc 23 with a very small aperture is the next optical element in the path. It reduces the total amount of energy admitted to the optical measurement system. The light beam passing through the aperture is again partially diffused by a second frosted Suprasil® window 24 which eliminates any high intensity portions of the UV source image. Two UV filters 25 and 26 are separated from the window 24 by a spacer 27. As the UV light travels toward the two UV filters 25 and 26 through the spacer 27, the light is further dispersed to produce low intensity level UV. At this point, the UV level is sufficiently low and dispersion sufficient that solarization of the two UV filters 25 and 26 is virtually nonexistent. Of course, the Suprasil® windows 22 and 24 and metallic aperture 23 are not susceptible to solarization.

The UV filters 25 and 26 are separated from a silicon photodetector 28 by a second spacer 29. The attenuated and dispersed UV light travels through the filters 25 and 26, which block all but UV light, and the spacer 29 and is impinged on the silicon photodetector 28 mounted on a printed circuit board (PCB) 30. The detector 28 converts the UV intensity to a current proportional to UV intensity.

In addition to providing very high resistance to solarization, the design also provides a hermetically sealed chamber (as particularly shown in FIG. 2A) for the optical components. Hermetic sealing allows the user of optical filters and other components, which are susceptible to moisture and external gases, such as hydrogen sulfide, which would otherwise damage the components. O-rings 31 and 32, which are composed of resilient and very inert materials, seal off the optical chamber and prevent any outside gas or material from entering. O-ring 31 is the smaller of the two and is placed on the interior shoulder 213 to provide a seal between the housing 21 and the first window 22. O-ring 32 is placed on the exterior shoulder and provides a seal between the housing 21, spacer 29, and a PCB 30 fastened to the housing 21 by, for example, screws 33. The O-rings 31 and 32 are typically silicone or similar inert, but elastic material.

Changing the length of the spacers 27 and 29 also controls attenuation of the UV light. The longer the spacer, the greater the attenuation, and vice versa. This is because the diffused light scatters to a greater degree as the length of the spacers increases. Thus, the aperture and the spacer lengths control attenuation.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A UV sensor which eliminates solarization effects on optical components of the sensor comprising:

a housing having cavity opening to a first end of the housing and a viewing port opening to a second end of the housing to receive incident radiation and communicating the incident radiation to the cavity;

a first UV transmitting, extremely low solarization window positioned in the cavity to receive incident radiation, a back surface of the first window being frosted to produce diffusion of UV rays in the incident radiation;

an aperture plate within the cavity having a small aperture for passing only a small amount of the diffused UV rays from the first window;

a second UV transmitting, extremely low solarization window positioned within the cavity to receive the diffused UV rays passed by the aperture, aback surface of the second window being frosted to produce diffusion of UV rays passed by the aperture;

a UV filter positioned in the cavity to receive diffused UV rays from the second window, said UV filter passing only radiation in a frequency band of interest; and a photodetector positioned to receive radiation passed by the UV filter.

2. The UV sensor recited in claim 1, further comprising a first spacer between the second window and the UV filter, light passing through said first spacer being further dispersed to produce low intensity UV radiation.

3. The UV sensor recited in claim 2, further comprising a second spacer between the UV filter and the photodetector, radiation passing through said second spacer being further dispersed before impinging on said photodetector.

4. The UV sensor recited in claim 3, wherein the second spacer is positioned within the cavity and further comprising:

a first sealing member providing a hermetic seal of the first window to an interior shoulder of the cavity; and a second sealing member providing a hermetic seal of the second spacer to an exterior shoulder of the cavity.

5. The UV sensor recited in claim 4, wherein the cavity is cylindrical and the first and second sealing members are O-rings.

6. The UV sensor recited in claim 1, wherein the first and second UV transmitting, extremely low solarization windows are composed of fused silica.

* * * * *